United States Patent
Lynch

(10) Patent No.: US 8,113,313 B2
(45) Date of Patent: Feb. 14, 2012

(54) PIPE ASSEMBLY WITH SCOOP FOR DIRECTING FLUID INTO A STANDPIPE AND FOR MITIGATING ACOUSTIC AND VORTEX COUPLED RESONANCE

(75) Inventor: John Lynch, Morgan Hill, CA (US)

(73) Assignee: Areva NP Inc., Lynchburg, VA (US)

( * ) Notice: Subject to any disclaimer, the term of this patent is extended or adjusted under 35 U.S.C. 154(b) by 0 days.

(21) Appl. No.: 12/639,679

(22) Filed: Dec. 16, 2009

(65) Prior Publication Data

US 2010/0186825 A1 Jul. 29, 2010

Related U.S. Application Data

(60) Provisional application No. 61/206,124, filed on Jan. 28, 2009.

(51) Int. Cl.
*F01N 1/02* (2006.01)
*F16L 55/00* (2006.01)
*F17D 1/16* (2006.01)
*F24H 9/12* (2006.01)

(52) U.S. Cl. ............. 181/250; 137/13; 138/37; 138/103

(58) Field of Classification Search .................. 181/250; 137/12, 13; 138/103, 37
See application file for complete search history.

(56) References Cited

U.S. PATENT DOCUMENTS

| | | | | |
|---|---|---|---|---|
| 1,487,845 A * | 3/1924 | Galusha | ............................. | 48/63 |
| 1,989,163 A * | 1/1935 | Beck et al. | ...................... | 138/37 |
| 2,141,797 A * | 12/1938 | Minella | ............................. | 138/37 |
| 2,164,011 A * | 6/1939 | Hilborn | ............................... | 47/2 |
| 2,227,716 A * | 1/1941 | Ingham | ............................. | 138/37 |
| 2,486,141 A * | 10/1949 | Follo | ................................ | 138/37 |
| 3,068,904 A * | 12/1962 | Moody | ............................ | 138/37 |
| 3,981,322 A * | 9/1976 | Gebelius | ...................... | 137/318 |
| 4,162,546 A * | 7/1979 | Shortell | ............................ | 4/696 |
| 5,924,436 A * | 7/1999 | Kitani et al. | ............... | 137/15.09 |
| 6,164,411 A * | 12/2000 | Zoccola, Jr. | .................. | 181/255 |
| 6,427,671 B1 * | 8/2002 | Holze et al. | ............. | 123/568.17 |
| 6,966,328 B2 * | 11/2005 | Benham | ................... | 137/101.11 |
| 7,174,919 B2 * | 2/2007 | Kenyon et al. | .................. | 138/37 |
| 2003/0070718 A1 * | 4/2003 | Benham | ........................ | 137/861 |
| 2008/0149201 A1 * | 6/2008 | Sommerville et al. | ........ | 137/593 |
| 2009/0127024 A1 * | 5/2009 | Lynch | ........................... | 181/247 |
| 2009/0166125 A1 * | 7/2009 | Lynch | ........................... | 181/212 |

* cited by examiner

*Primary Examiner* — Edgardo San Martin
*Assistant Examiner* — Christina Russell
(74) *Attorney, Agent, or Firm* — Davidson, Davidson & Kappel, LLC

(57) ABSTRACT

A piping assembly for directing fluid and mitigating acoustic and vortex coupled resonance is provided that includes a main pipe delivering fluid in a first direction; a standpipe coupled to the main pipe at an intersection; and a scoop positioned at the intersection directing the fluid towards the standpipe. A scooping insert and a method for disrupting vortex shedding in a piping assembly are also provided.

23 Claims, 9 Drawing Sheets

PIPE ASSEMBLY WITH SCOOP FOR DIRECTING FLUID INTO A STANDPIPE AND FOR MITIGATING ACOUSTIC AND VORTEX COUPLED RESONANCE

The present invention relates generally to the reduction of high pressure oscillations associated with fluid flow past a standpipe and more specifically to a pipe assembly with a scoop for directing fluid traveling in a main pipe into a standpipe to mitigate acoustic and vortex coupled resonance.

BACKGROUND OF THE INVENTION

Power plants experience damage to relief valves and to fluid dryers caused by vortex shedding coupling with an acoustic mode in standpipes and other dead end piping branches. An acoustic side branch consisting of a large cantilevered "Helmholtz resonator" has been used on standpipes in some power plants to reduce vortex shedding. However, such a modification may be difficult and expensive.

U.S. Publication No. 2008/0149201 A1 discloses a main flow line and relief valve assembly that includes a main line fitted with a standpipe and a relief valve fitted within the standpipe. A sleeve is inserted in the standpipe below the relief valve to extend into the main line for mitigating acoustic cavity resonances.

SUMMARY OF THE INVENTION

The present invention may prevent acoustic resonance caused by the flow past an entrance to a standpipe.

A piping assembly for directing fluid and mitigating acoustic and vortex coupled resonance is provided that includes a main pipe delivering fluid in a first direction, a standpipe coupled to the main pipe at an intersection and a scoop positioned at the intersection directing the fluid towards the standpipe.

A scooping insert for directing fluid from a main pipe into a standpipe and mitigating acoustic and vortex coupled resonance at an entrance to the standpipe is also provided. The scooping insert includes a scoop having a first end for fluid to enter and a second end opposite the first end for fluid to exit. The first end is angled to direct fluid toward the second end. The scooping insert also includes a body portion coupled to the second end of the scoop and a coupling portion coupled to the body portion for attachment to a pipe.

A method for mitigating acoustic and vortex coupled resonance at an entrance to a standpipe is also provided. The method includes providing a scoop in an intersection between a main pipe and a standpipe to direct fluid flowing through the main pipe upward into the standpipe.

BRIEF DESCRIPTION OF THE DRAWINGS

The present invention is described below by reference to the following drawings, in which.

DETAILED DESCRIPTION

Figure 1:
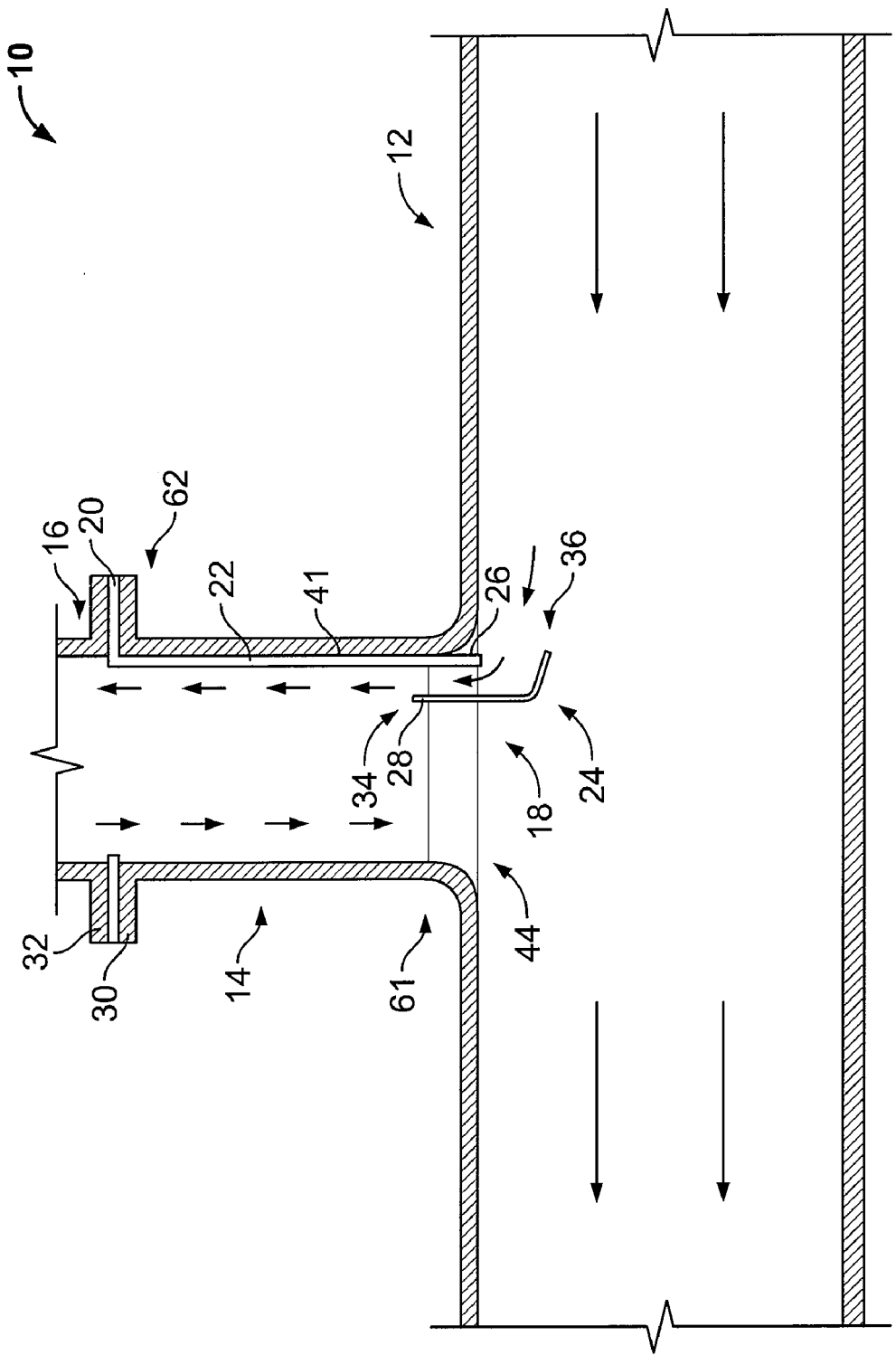
FIG. 1 schematically shows a longitudinal cross-sectional view of a portion of a pipe assembly according to a preferred embodiment of the present invention.
Figure 2:
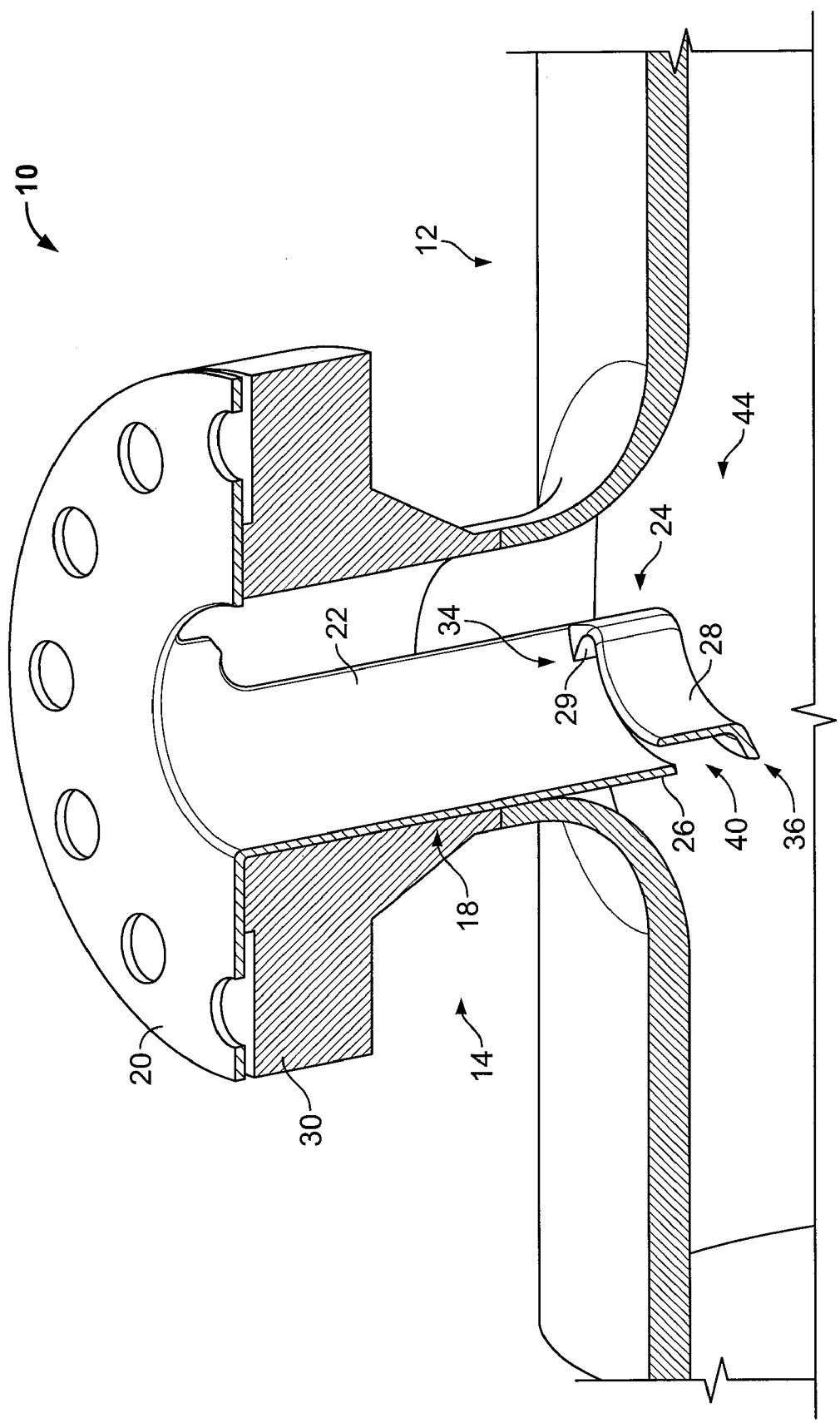
FIG. 2 schematically shows a cut-away perspective view of a first longitudinal half of the pipe assembly shown in FIG. 1.
Figure 3:
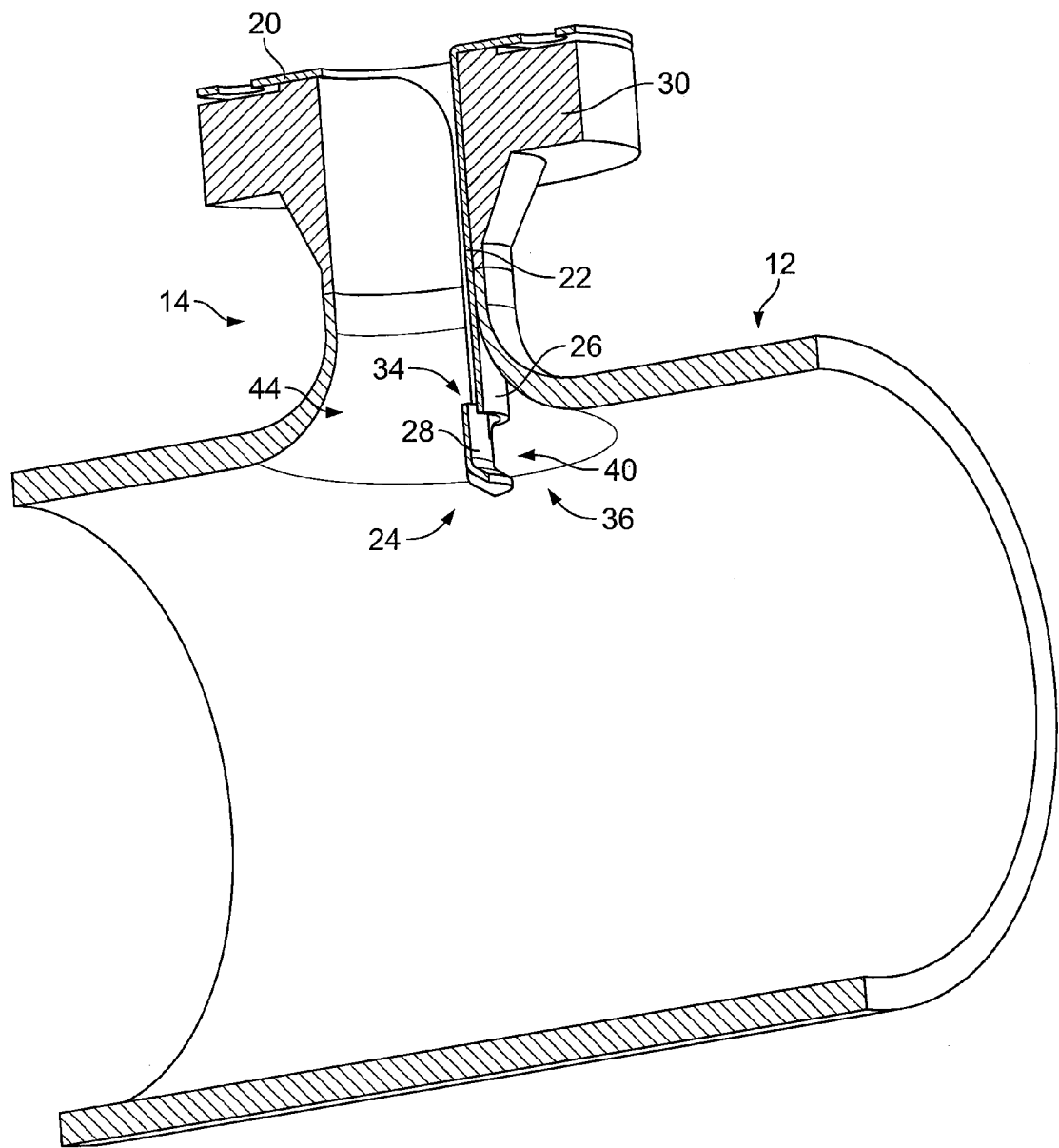
FIG. 3 schematically shows a cut-away perspective view of a second longitudinal half of the pipe assembly shown in FIGS. 1 and 2.
Figure 4:
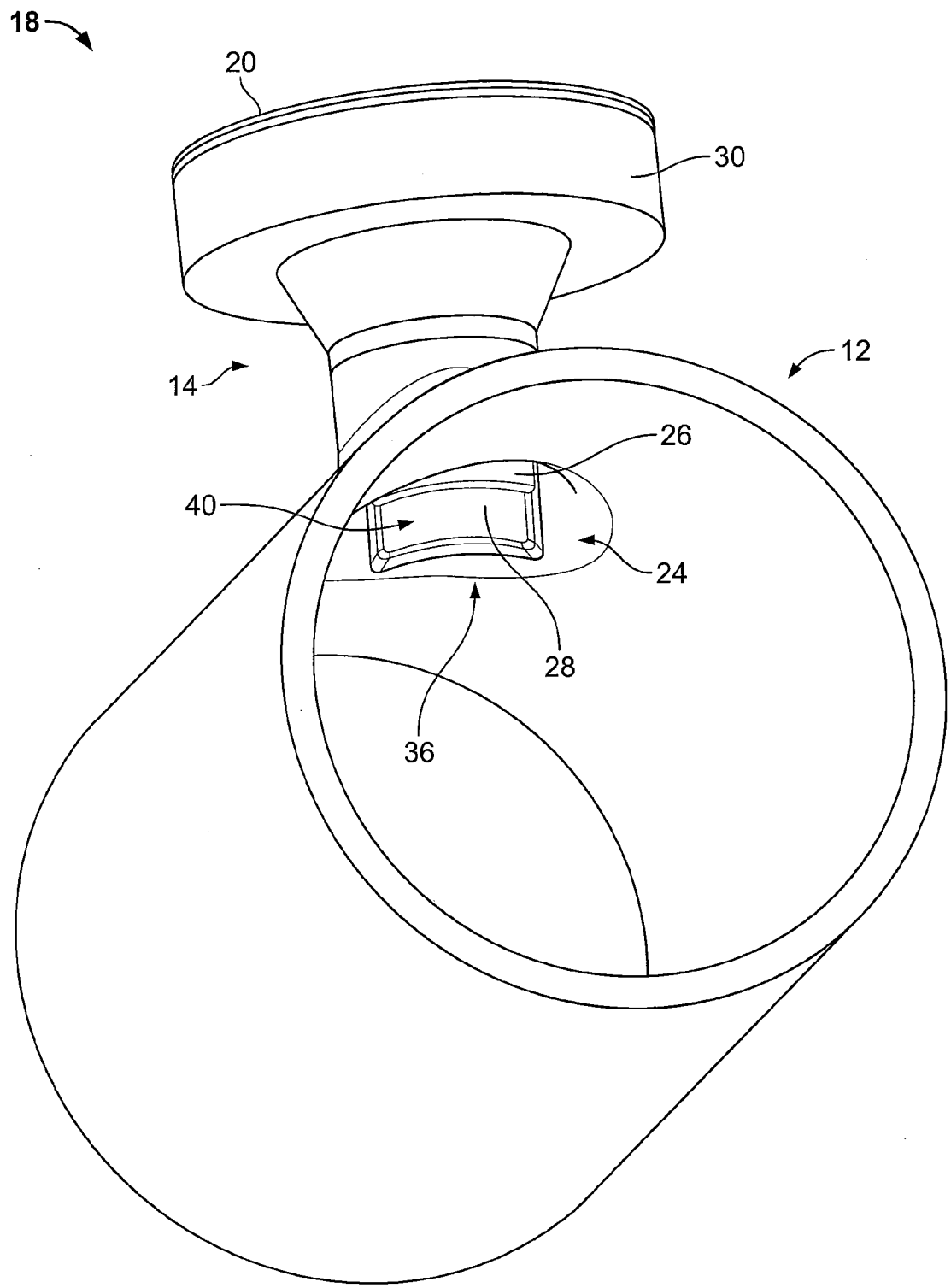
FIG. 4 schematically shows an upstream perspective view of the pipe assembly shown in FIGS. 1 to 3.

FIG. 1 schematically shows a longitudinal cross-sectional view of a portion of a pipe assembly 10 according to a preferred embodiment of the present invention. FIGS. 2, 3 and 4 schematically show perspective views of pipe assembly 10, with FIGS. 2 and 3 showing cut-away perspective views of the two longitudinal halves of pipe assembly 10 and FIG. 4 showing an upstream view of pipe assembly 10. Pipe assembly 10 may transport fluids, such as steam flowing from a nuclear reactor. Pipe assembly 10 includes a main pipe 12, a standpipe 14, a relief valve 16 (omitted from FIGS. 2 to 4 for clarity) and a scoop insert 18. A first end 61 of standpipe 14 is coupled to main pipe 12 at an intersection 44 and a second end 62 of standpipe 14 is coupled to relief valve 16. During normal operation, when a pressure in pipe assembly 10 is below a predetermined threshold of relief valve 16 and relief valve 16 is closed, steam in main pipe 12 flows from upstream of standpipe 14 to downstream of standpipe 14. Scoop insert 18 is arranged to extend into main pipe 12 and drive a small portion of steam flowing through main pipe 12 upward into standpipe 14 to closed relief valve 16 and back into main pipe 12. The upwardly directed steam then recirculates back into the main pipe 12, thereby disrupting vortex shedding past the inlet of standpipe 14.

Scoop insert 18 includes a coupling portion 20, which may be flange 20, a body portion 22, which in this embodiment has semi-cylindrical shape, and a scoop 24. Flange 20 may be fixed in between a flange 30 of standpipe 14 and a flange 32 of relief valve 16. Body portion 22 extends downwardly from flange 20 against an inner circumference 41 of standpipe 14 and connects scoop 24 to flange 20, which couples scoop 24 to second end 62 of standpipe 14. Scoop 24 is positioned with a top end 34 of scoop 24 in standpipe 14 and a bottom end 36 of scoop 24 in main pipe 12, so that scoop 24 is located at intersection 44 of standpipe 14 and main pipe 12 on an upstream side of standpipe 14 with respect to main pipe 12 and extends from within standpipe 14 into main pipe 12. Scoop 24 may include a front face 26 extending downward from body portion 22 having an opening 40 formed therein. In this embodiment, front face 26 is integral and flush with body portion 22. Scoop 24 also includes a channeling face 28 opposite of front face 26 extending from within standpipe 14 into main pipe 12. Channeling face 28 is positioned to channel steam flowing through main pipe 12 into standpipe 14. Channeling face 28 is substantially parallel with standpipe 14 at top end 34 and is angled with respect to standpipe 14 at bottom end 36, so scoop 24 redirects steam flowing through main pipe 12 by approximately ninety degrees. In this embodiment, front face 26 has a semi-cylindrical shape and channeling face 28 has a semi-cylindrical shape at top end 34. Thus, at top end 34, front face 26 has a convex shape with respect to channeling face 28 and channeling face 28 has a concave shape with respect to front face 26. Scoop 24 may also include channeling sides 27, 29 connecting front face 26 and channeling face 28 that assist in directing steam from main pipe 12 to standpipe 14. In a preferred embodiment, standpipe 14 is six inches in diameter and main pipe 12 is twenty-four inches in diameter.

In alternative embodiment, flange 20 and body portion 22 may be omitted and scoop 24 may be directly coupled to at least one of main pipe 12 and standpipe 14, for example by welding.

Figure 5:
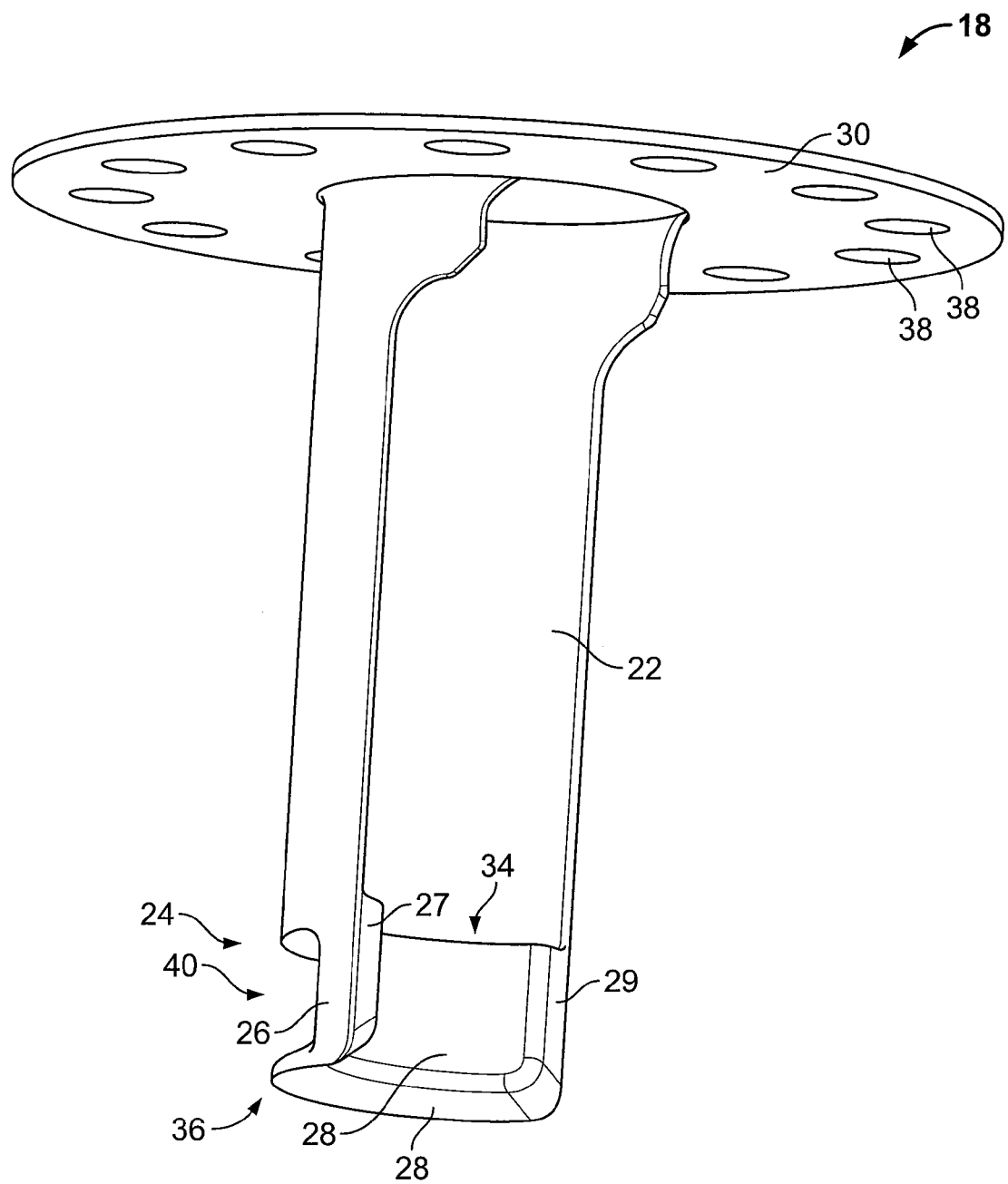
FIG. 5 schematically shows a downstream perspective view of a scoop insert of the piping assembly shown in FIGS. 1 to 4.
Figure 6:
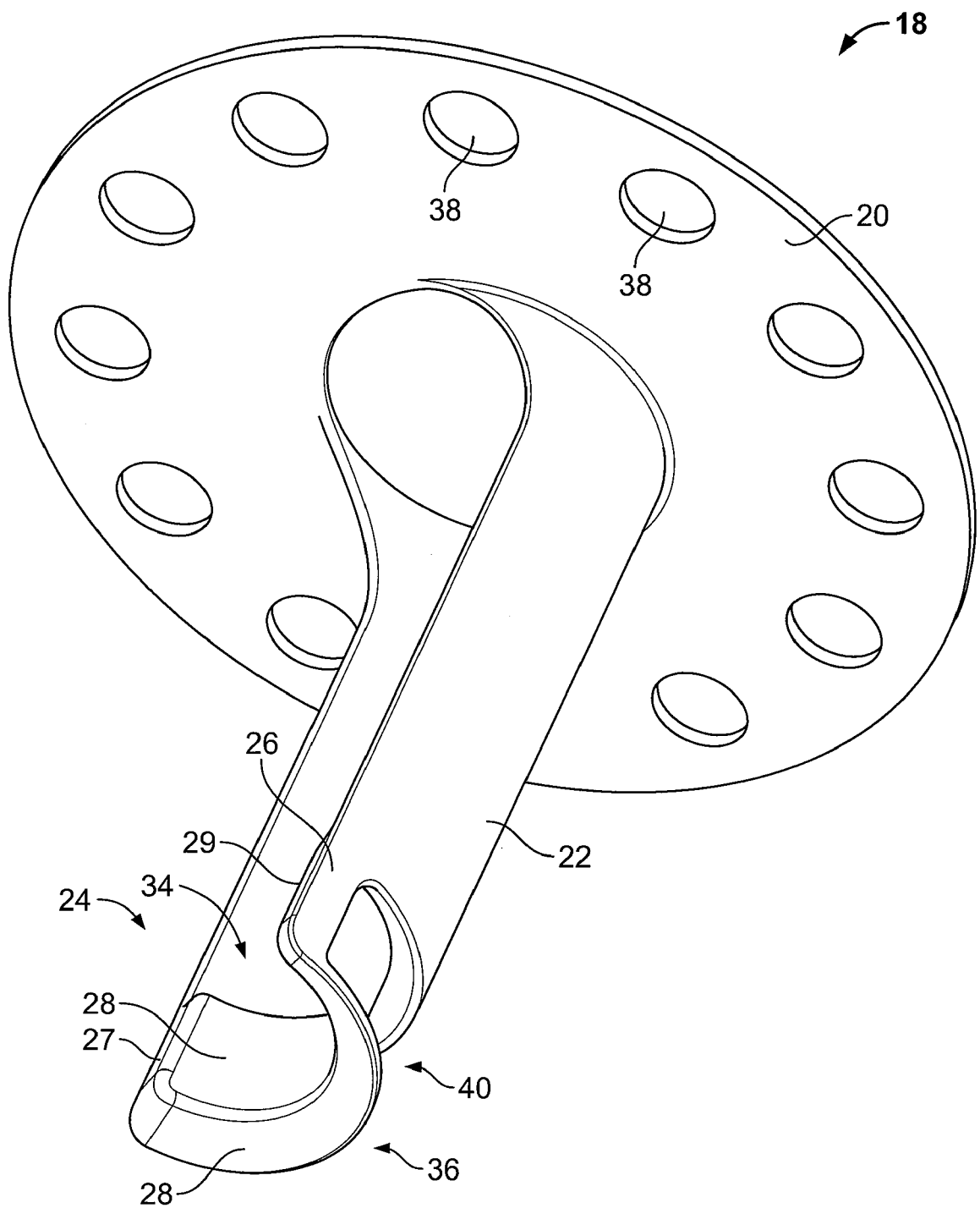
FIG. 6 schematically shows a side perspective view of the scoop insert shown in FIG. 5.

FIGS. 5 and 6 show a downstream perspective view and side perspective view, respectively, of scoop insert 18. Flange 20 has evenly spaced holes 38 formed therein. Fasteners such as bolts may be passed through holes 38 to secure flange 20 to at least one of standpipe 14 (FIGS. 1 to 4) or relief valve 16 (FIG. 1). Front face 26 extends downward from body portion 22 and has opening 40 defined therein for steam to enter and be directed upwards by channeling face 28 towards body portion 22 and flange 20. Channeling face 28 is parallel to body portion 22 at top end 34, but extends downward and curves towards front face 26 at bottom end 36.

Figure 7:
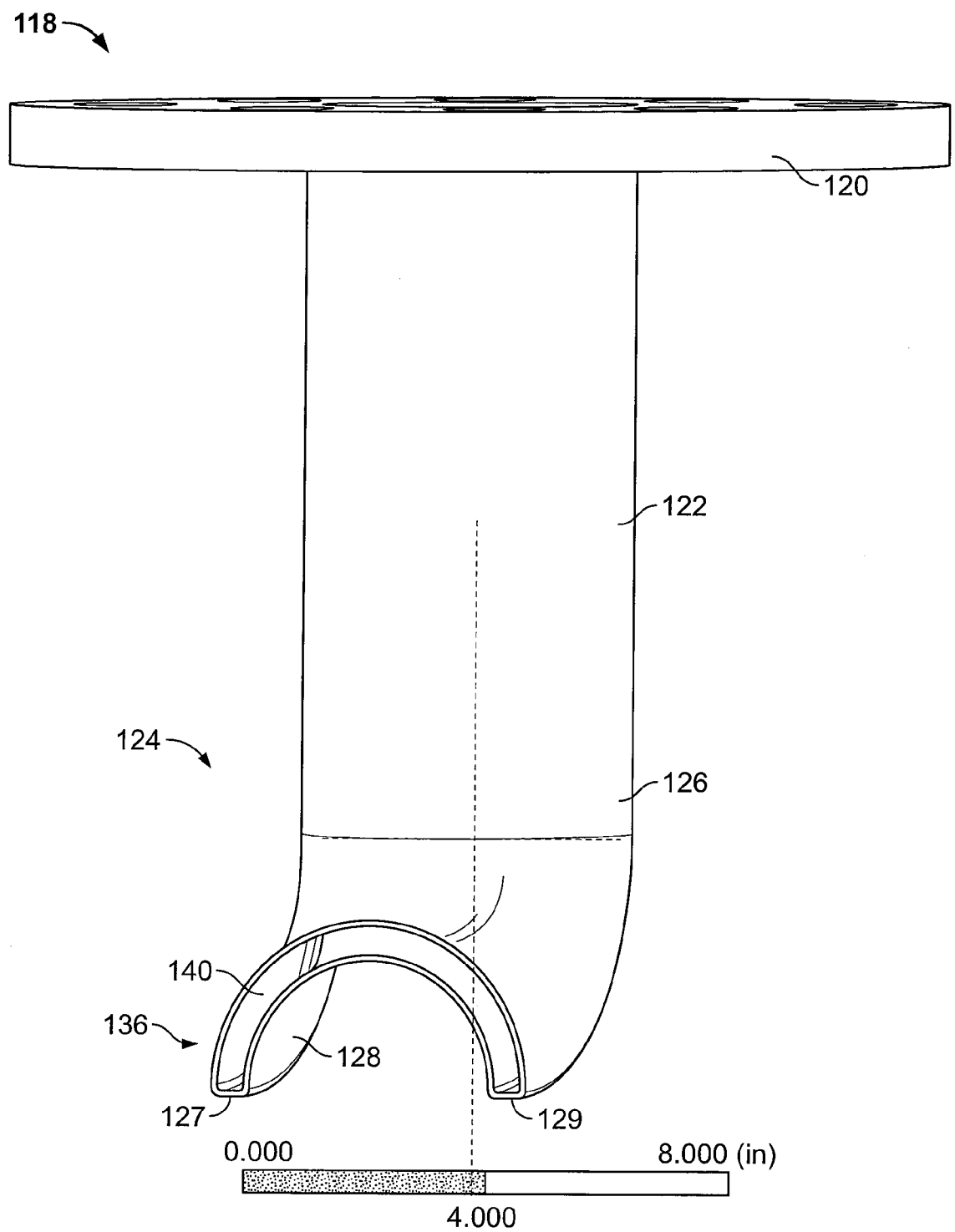
FIG. 7 schematically shows an upstream perspective view a scoop insert according to another embodiment of the present invention.
Figure 8:
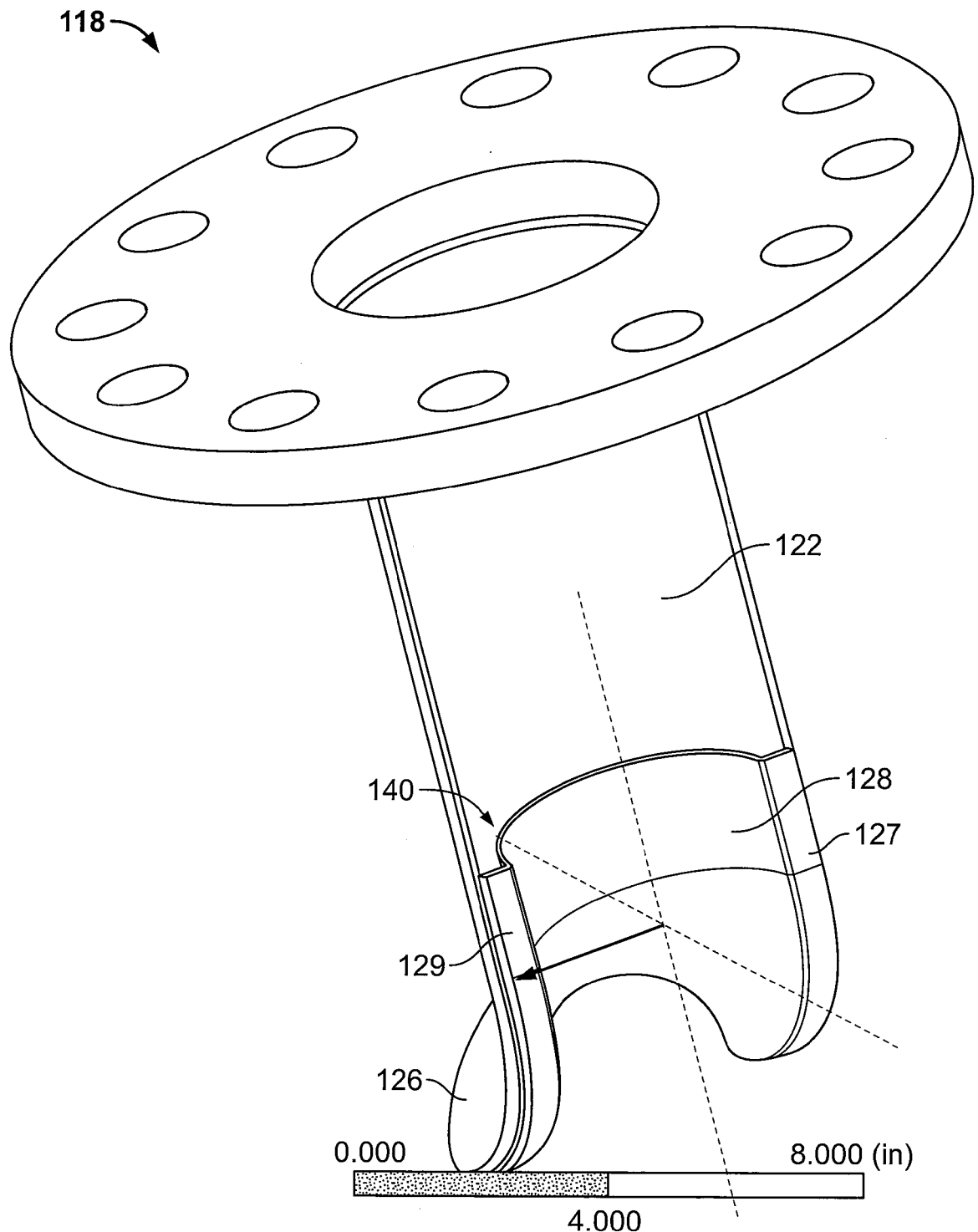
FIG. 8 schematically shows a downstream perspective view of the scoop insert shown in FIG. 7.

FIGS. 7 and 8 show a perspective upstream view and a perspective downstream view of a scoop insert 118 according to another embodiment of the present invention. Scoop insert 118 may be inserted in standpipe 14 (FIGS. 1 to 4) to direct steam from main pipe 12 (FIGS. 1 to 4) into standpipe 14 in substantially the same manner as scoop insert 18 (FIGS. 1 to 6). Scoop insert 118 includes a flange 120, a body portion 122 and a scoop 124. Scoop 124 includes a front face 126, a channeling face 128 and channeling sides 127, 129. Channeling sides 127, 129 connect front face 126 and channeling face 128 and assist in directing steam from main pipe 12 (FIGS. 1 to 4) to standpipe 14 (FIGS. 1 to 4). Body portion 122 extends downward from flange 120 to front face 126 at a top end 134 of scoop 124, which curves away from body portion 122 at a bottom end 136 and protrudes past body portion 122 upstream in main pipe 12 (FIGS. 1 to 4). At bottom end 136, at least a portion of front face 126 may contact an inner circumference of main pipe 14 (FIGS. 1 to 4). Channeling sides 127, 129 extend inwardly from front face 126, connecting front face 126 with channeling face 128. Front face 126, channeling face 128 and channeling sides 127, 129 define an opening 140 for steam to flow through, which scoop 124 directs towards body portion 122 and flange 120. At both ends 134, 136, opening 140 has a semi-annular shape.

Figure 9:
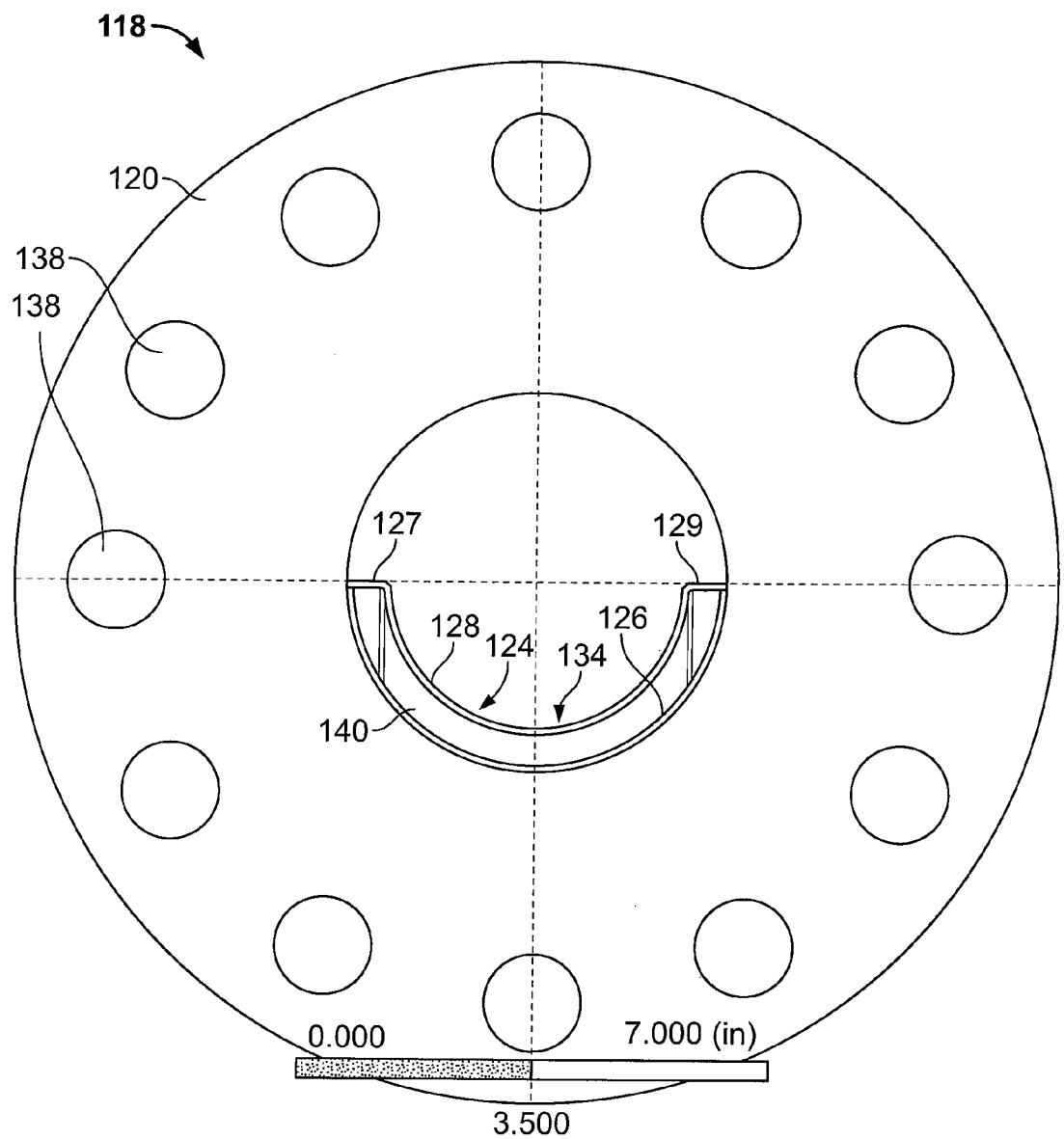
FIG. 9 schematically shows a top view of the scoop insert shown in FIGS. 7 and 8.

FIG. 9 shows a top view of scoop insert 118. Top end 134 of scoop 124 is shown, with channeling sides 127, 129 extending radially inward from front face 126 towards channeling face 128. Front face 126 has a convex shape with respect to channeling face 128 and channeling face 128 has a concave shape with respect to front face 126.

In the preceding specification, the invention has been described with reference to specific exemplary embodiments and examples thereof It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A piping assembly for directing fluid and mitigating acoustic and vortex coupled resonance comprising:
    a main pipe delivering fluid in a first direction;
    a standpipe coupled to the main pipe at an intersection; and
    a scoop positioned at the intersection directing the fluid towards the standpipe, the scoop including an inlet and outlet, the fluid entering the inlet of the scoop from the main pipe and exiting the outlet of the scoop into the standpipe, the outlet of the scoop being arranged with respect to the standpipe such that fluid exiting the outlet of the scoop enters the standpipe and passes back into the main pipe.

2. The piping assembly recited in claim 1 further comprising a body portion coupled to the scoop extending along an inner circumference of the standpipe.

3. The piping assembly recited in claim 2 further comprising a coupling portion for coupling the body portion to the standpipe.

4. The piping assembly recited in claim 1 wherein the scoop includes a channeling face that extends from inside the main pipe to inside the standpipe.

5. The piping assembly recited in claim 4 wherein the scoop further includes a front face offset from the channeling face.

6. The piping assembly recited in claim 1 wherein the scoop has an opening formed therein for fluid to pass through.

7. The piping assembly recited in claim 1 further comprising a relief valve coupled to the standpipe.

8. The piping assembly as recited in claim 7 wherein the relief valve is closed during normal operation when a pressure in the pipe assembly is below a predetermined threshold of the relief valve.

9. The piping assembly as recited in claim 1 wherein the fluid is steam and the scoop directs the steam into the standpipe such that the steam flows into the standpipe and back towards the main pipe to mitigate acoustic and vortex coupled resonance at the entrance to the standpipe.

10. A scooping insert for directing fluid from a main pipe into a standpipe and mitigating acoustic and vortex coupled resonance at an entrance to the standpipe comprising:
    a scoop having a first end for fluid to enter and a second end opposite the first end for fluid to exit, the first end being angled to direct fluid toward the second end;
    a body portion coupled to the second end of the scoop; and
    a coupling portion coupled to the body portion for attachment to the standpipe,
    the body portion extending from the second end of the scoop to the coupling portion such that the second end of the scoop is positionable into the standpipe such that fluid exiting the second end of the scoop enters the standpipe and passes back into the main pipe.

11. The scooping insert recited in claim 10 wherein the scoop includes a channeling face offset from the body portion for redirecting fluid towards the body portion.

12. The scooping insert recited in claim 11 wherein the channeling face is angled with respect to the body portion at the first end of the scoop.

13. The scooping insert recited in claim 11 wherein the scoop includes a front face opposite the channeling face extending from the body portion.

14. The scooping insert recited in claim 13 wherein the front face has a convex shape with respect to the channeling face at the second end.

15. The scooping insert recited in claim 13 wherein the channeling face has a concave shape with respect to the front face at the second end.

16. The scooping insert recited in claim 13 wherein the scoop includes channeling sides connecting the channeling face and the front face.

17. The scooping insert recited in claim 10 wherein the scoop has an opening formed therein for fluid to pass through.

18. The scooping insert recited in claim 17 wherein the opening has a semi-annular shape at the second end.

19. A method for mitigating acoustic and vortex coupled resonance at an entrance to a standpipe comprising:

providing a scoop in an intersection between a main pipe and a standpipe such that an inlet end of the scoop is positioned in the main pipe and an outlet end of the scoop is positioned to direct fluid into the standpipe; and supplying fluid into the main pipe such that the scoop directs the fluid flowing through the main pipe upward into the standpipe.

20. The method as recited in claim 19 wherein the providing a scoop includes coupling the scoop to an end of the standpipe.

21. The method as recited in claim 19 wherein the fluid is steam and the scoop directs the steam into the standpipe such that the steam flows into the standpipe and back towards the main pipe to mitigate acoustic and vortex coupled resonance at the entrance to a standpipe.

22. The method as recited in claim 19 wherein the scoop directs the fluid towards a closed relief valve at the end of the standpipe such that the fluid reenters the main pipe.

23. The method as recited in claim 22 wherein the relief valve is closed during normal operation when a pressure in pipe assembly is below a predetermined threshold of the relief valve.

* * * * *